(12) United States Patent
Dean

(10) Patent No.: US 7,569,627 B2
(45) Date of Patent: *Aug. 4, 2009

(54) HOT MELT BINDER FOR ASPHALT PRODUCT WITH REDUCED PRODUCTION TEMPERATURE AND APPLICATIONS OF SAID BINDER

(75) Inventor: Jean-Pierre Dean, Paris (FR)

(73) Assignee: COLAS, Boulogne-Billancourt (FR)

( * ) Notice: Subject to any disclaimer, the term of this patent is extended or adjusted under 35 U.S.C. 154(b) by 358 days.

This patent is subject to a terminal disclaimer.

(21) Appl. No.: 10/558,294

(22) PCT Filed: May 28, 2004

(86) PCT No.: PCT/FR2004/001335

§ 371 (c)(1),
(2), (4) Date: Mar. 30, 2006

(87) PCT Pub. No.: WO2004/108830

PCT Pub. Date: Dec. 16, 2004

(65) Prior Publication Data

US 2006/0230981 A1   Oct. 19, 2006

(30) Foreign Application Priority Data

May 28, 2003 (FR) .................................. 03 06535

(51) Int. Cl.
*C08L 91/06* (2006.01)
*C08L 95/00* (2006.01)

(52) U.S. Cl. .............................. 524/70; 524/68; 524/69; 524/71; 524/275; 524/277; 524/487; 524/488; 524/489; 106/272; 106/281.1

(58) Field of Classification Search .......... 524/87–489, 524/68–71; 106/272, 281.1
See application file for complete search history.

(56) References Cited

U.S. PATENT DOCUMENTS

| 2,610,956 | A | | 9/1952 | Derksen et al. |
| 2,779,745 | A | * | 1/1957 | Howland ..................... 523/205 |
| 4,468,254 | A | * | 8/1984 | Yokoyama et al. .......... 106/271 |
| 5,120,355 | A | * | 6/1992 | Imai .............................. 106/2 |
| 6,362,257 | B1 | * | 3/2002 | Chehovits et al. ............. 524/59 |
| 2005/0255166 | A1 | * | 11/2005 | Moloney .................... 424/539 |

FOREIGN PATENT DOCUMENTS

| DE | 146 222 | | 1/1981 |
| DE | 146222 | * | 1/1981 |
| EP | 543 246 | | 5/1993 |
| GB | 2 234 512 | | 2/1991 |
| JP | 2003077210 | * | 6/1981 |
| WO | WO 98/18864 | | 5/1998 |
| WO | WO 00/60028 | | 10/2000 |

OTHER PUBLICATIONS

Database WPI—Derwent Publications Ltd., London, GB, AN-2003-601288; XP002254240 "Modified Asphalt Composition, for Road Pavement, Comprises Asphalt, Rubber and/or Thermoplastic Elastomer, and Wax" & JP 2003 055559 A (KAO Corp.) Feb. 26, 2003.

* cited by examiner

*Primary Examiner*—Peter Szekely
(74) *Attorney, Agent, or Firm*—Sughrue Mion, PLLC

(57) ABSTRACT

The binder is produced based on natural bitumen, or bitumen from the oil industry, and comprises a first additive which is constituted by a hydrocarbon wax whose melting point is greater than 85° C.

This binder further comprises a fatty acid ester wax which is of synthetic, vegetable or fossil vegetable origin and which has a melting point of less than 85° C.

Use in the production of sealing coatings for buildings or civil engineering works, coatings for traffic routes or urban amenities.

26 Claims, No Drawings

HOT MELT BINDER FOR ASPHALT PRODUCT WITH REDUCED PRODUCTION TEMPERATURE AND APPLICATIONS OF SAID BINDER

The present invention relates to a thermofusible binder for an asphalt product, this binder being based on natural bitumen or bitumen from the oil industry, of the type comprising, in addition to this base product, a first additive which is constituted by a hydrocarbon wax whose melting point, measured in accordance with the standards ASTM D3945 and D3418, is greater than 85° C.

In the present description, "asphalt product" is intended to refer to a hot-pourable mixture of thermofusible binder of the bituminous type with a mineral filler.

A well-known asphalt product to which the invention can be applied is poured asphalt, which is a mixture without cavities which is produced in the hot state and which is generally based on bitumen and mineral fillers which may be asphalt powder. This mixture can be hot-poured and hardens by means of simple cooling in order to provide various types of coating. The invention is also used for bituminous concretes which are produced by aggregates being coated with the binder.

The mineral fillers used comprise fines, that is particles having dimensions of less than 0.08 mm, optionally aggregates, that is sand, that is to say, particles having dimensions of between 0.08 and 2 mm, and optionally gravel, that is to say, particles having dimensions greater than 2 mm.

A thermofusible binder of the bituminous type for an asphalt product may be natural bitumen or bitumen from the oil industry.

The binder may further contain various additives, such as polymers.

The preparation of an asphalt product, such as poured asphalt, comprises mixing the binder and the fillers at a temperature which is referred to as the "production" temperature, then pouring this mixture at a temperature for use, and finally cooling the poured mixture.

Generally, the production temperature is between 200° C. and 270° C. depending on the compositions, and is even higher when hard asphalt is desired after cooling. This high temperature has the disadvantage of degrading the binders and bringing about the production of fumes which contain volatile organic compounds.

In order to overcome this problem, known binders of the above-mentioned type (FR-A-2 721 936) contain a hydrocarbon wax whose melting point is greater than 85° C.

"Hydrocarbon wax" refers to saturated hydrocarbon polymers which have a low molecular weight and a characteristic appearance, which are solid at ambient temperature, and which have a relatively clear melting point and a low viscosity. Their appearance is translucent to opaque, but never vitreous. These polymers thus differ in terms of their properties from commonly used polymers and elastomers which have a relatively wide melting zone and which change gradually from the solid state to the liquid state when the temperature increases. Furthermore, these hydrocarbon waxes are insoluble in bitumen at ambient temperature.

"Low molecular weight" is intended to refer to a molecular weight lower than approximately 6000 g/mol and generally between 500 and 6000 g/mol. Waxes of this type allow the viscosity of the product to be significantly reduced when the product is used. The production temperature of asphalt using a binder of the above-mentioned type is thus reduced by from 30 to 40° C. compared with conventional asphalts.

Furthermore, although these hydrocarbon waxes are soluble in bitumen at the production temperature, they precipitate during cooling and form a network of fibres so as to "strengthen" the poured coating.

Asphalt produced based on a binder of the above-mentioned type thus has improved mechanical properties, in particular in terms of resistance to static loads and flow resistance when the temperature is increased.

However, binders of the above-mentioned type are no longer entirely satisfactory, and in particular, owing to environmental constraints, the development of regulations will require the emission of fumes to be considerably reduced when producing or using coatings which contain hydrocarbon binders of the poured asphalt or bituminous concrete type.

In the binders described in FR-A-2 721 936, the mass content in terms of hydrocarbon wax in the binder is less than 15% of the total mass of the binder. If this content is increased, the production temperature of the asphalt decreases to some degree, but this decrease in temperature is accompanied by a significant degradation of the mechanical properties of the poured asphalt after cooling.

The object of the invention is therefore to provide a binder which allows asphalt products to be produced, in particular poured asphalts or bituminous concretes, at a lower temperature whilst retaining the mechanical properties of the products obtained.

To this end, the subject-matter of the invention is a binder of the above-mentioned type, characterised in that it further comprises a second additive which is constituted by a fatty acid ester wax, this wax being of synthetic, vegetable or fossil vegetable origin, and having a melting point, measured in accordance with the above standards, of less than 85° C.

"Fatty acid ester" refers to carboxylic organic monoacid esters having long carbon-containing chains, in particular having linear carbon-containing chains. The molecules of these ester waxes comprise a carbon number greater than 20 and preferably greater than 40. These products may be of vegetable origin, for example, from vegetable palm oils, of fossil vegetable origin, such as, for example, from fossil waxes of lignite, or of synthetic origin. These fatty acid ester waxes have a clear melting point and a low viscosity as soon as their melting point is reached.

Examples of fatty acid esters are montanic acid esters (or octacosanoic acid esters), acid having the formula $C_{28}H_{56}$—$O_2$, or lignoceric acid esters (or tetracosanoic acid ester), acid having the formula $C_{24}H_{48}$—$O_2$.

According to other features of the binder in accordance with the invention:
  the penetrability of the base product is in the order of 35/50;
  the hydrocarbon wax is substantially insoluble in the base bitumen of the binder at ambient temperatures;
  the acid value of the fatty acid ester is between 10 and 70 mg KOH/g, in particular between 20 and 40 mg KOH/g; and
  the acid value is substantially 28 mg KOH/g.

Furthermore, the "acid value" refers to the mass in milligrammes of potassium hydroxide required to neutralise the free fatty acids in one gramme of acid ester wax.

The binder according to the invention may comprise one or more of the features to which claims 2 to 15 relate, taken in isolation or according to all technically possible combinations.

The invention also relates to a method for preparing an asphalt product which can be hot-poured and which hardens by means of simple cooling, comprising the following steps:

(a) a binder as defined above is mixed with fillers, in particular mineral fillers, such as fines, sand and optionally gravel,
(b) the mixture produced at step (a) is poured, and
(c) the poured mixture is allowed to cool, characterised in that the steps (a) and (b) are carried out at a temperature of between 150 and 170° C.

At this production temperature, no fumes can be seen when the asphalt is used. In practice, the fume emissions are reduced by a factor of 30 compared with asphalts described in FR-A-2 721 936, and by a factor of 500 compared with conventional asphalts.

The invention further relates to an asphalt product which can be hot-poured and which hardens by means of simple cooling, characterised in that it contains a binder as defined above and fillers, in particular mineral fillers, such as fines, sand and optionally gravel.

This asphalt product has a high level of resistance under static and/or dynamic load. It also has a high level of resistance to cooling and to heating.

According to a specific embodiment of the invention, the asphalt product contains recovered asphalt which is recycled during production.

"Asphalt recycled during production" is intended to refer to pieces of used asphalt coating which may be crushed. This recovered asphalt can be remelted in the hot state with a thermofusible binder according to the invention, with other fillers optionally being added. The molten asphalt mass can itself be hot-poured and hardened by means of cooling, in the same manner as a conventional asphalt product.

The asphalt products according to the invention can be used to produce sealing coatings for buildings, sealing coatings for civil engineering works, coatings for traffic routes and urban amenities.

In particular, they can be used to stabilise layers of rock, in particular in embankments, or to fill narrow trenches, in particular for laying cabling having a small cross-section.

"Cabling having a small cross-section" is intended to refer to cables having a diameter smaller than 20 mm, in particular low-power energy transmission cables or fibre-optic cables.

With regard to the stabilisation of rock layers, the product molten in the hot state is poured between stones and is referred to in this particular instance as "rock mastic". This provides sealing, for example, for embankments. The products according to the invention are particularly suitable for this use owing to their ability to flow in the hot state in a controlled manner and their high level of flow resistance on an inclined surface.

The thermofusible binder according to the invention is also used to coat waste products during a process for encapsulating waste products.

These waste products, which may be fine or very fine particles, must be stored and can be coated beforehand with encapsulating agents in order to isolate them, by means of treatment, from external surroundings and in particular prevent the phenomenon of lixiviation by means of rainwater. However, the finer the filler is, the greater the quantity of coating agent used up.

The binder of the invention, owing to its good ability to flow in the hot state, allows these fine particles to be completely coated using a modest quantity of coating agent and with a rigid and solid encapsulated mass being provided after cooling.

Furthermore, the invention relates to a bituminous concrete, characterised in that it contains a binder as defined above and mineral aggregates comprising sand and gravel. These bituminous concretes according to the invention can be used as a coating for pavements and traffic routes.

The following examples illustrate the invention.

These examples relate to poured asphalts which are prepared based on a binder according to the invention. These poured and cooled asphalts are subjected to various tests which are intended to define their properties.

Conventional indentation tests are carried out in accordance with or based on the standard NFT 66-002, by measuring the penetration of a stamp in the asphalt, under a load, for a specific length of time and temperature in order to define the hardness of the poured asphalt.

In the following examples, the percentages indicated are percentages by weight relative to the total weight of asphalt.

EXAMPLE 1

In this example, a poured asphalt of the "sealing sand-containing asphalt" type is prepared (AS2 according to the classification of the Cahier des Charges de l'Office Français des Asphaltes (French Asphalt Office specification sheet)). An asphalt (Néophalte® NS2) is further prepared which contains a polyethylene wax having a melting point of 125° C. at a ratio of 0.4% of the total weight of the asphalt. Finally, an asphalt according to the invention is produced which further contains a montanic acid ester wax at a ratio of 0.4% of the total weight of the asphalt.

These asphalts are typically used to seal terrace roofs.

The results which are set out in table 1 illustrate the effect of the fatty acid ester wax on the application temperature of the asphalt and the thermoplastic properties of this asphalt.

TABLE 1

|  | Bitumen binder 35/50 (%) | Hydrocarbon wax (%) | Montanic acid ester wax (%) | Application temperature (° C.) | Indentation $I_b$ (in $^1/_{10}$ mm) |
|---|---|---|---|---|---|
| Conventional asphalt AS2 | 9.4 | — | — | 240 | 47 |
| Néophalte ® NS2 | 9 | 0.4 | — | 205 | 52 |
| Asphalt according to the invention | 8.8 | 0.2 | 0.4 | 165 | 40 |

In this instance, the asphalt which contains a fatty acid ester wax according to the invention has an indentation value which is close to that of conventional asphalts and asphalts which contain only one hydrocarbon wax, but with an application temperature which is 75° C. lower and 40° C. lower, respectively.

EXAMPLE 2

In this example, a poured asphalt of the type used for surfacing roads in vehicle parking areas is prepared (AG2 according to the classification of the specification sheet of the French Asphalt Office.) An asphalt (Néophalte® NG2) is further prepared which contains a polyethylene wax having a melting point of 125° C. at a ratio of 0.4% of the total weight of the asphalt. Finally, an asphalt according to the invention is produced which further contains a montanic acid ester wax at a ratio of 0.4% of the total weight of the asphalt.

These asphalts are typically used for surfacing roads in vehicle parking areas.

The results which are set out in table 2 illustrate the effect of the fatty acid ester wax on the application temperature of the asphalt and the thermoplastic properties of this asphalt.

TABLE 2

| | Bitumen binder 35/50 (%) | Hydrocarbon wax (%) | Montanic acid ester wax (%) | Application temperature (° C.) | Indentation $I_b$ (in 1/10 mm) |
|---|---|---|---|---|---|
| Conventional asphalt AG2 | 7.7 | — | — | 240 | 24 |
| Néophalte ® NG2 | 7.3 | 0.4 | — | 205 | 15 |
| Asphalt according to the invention | 7.1 | 0.2 | 0.4 | 165 | 13 |

In this instance, the asphalt which contains a fatty acid ester wax according to the invention has an indentation value which is equivalent to conventional asphalts and asphalts which contain only one hydrocarbon wax, but with an application temperature which is 75° C. lower and 40° C. lower, respectively.

EXAMPLE 3

In this example, a poured asphalt of the type used for coating municipal pavements is prepared (AT2 according to the classification of the specification sheet of the French Asphalt Office.) An asphalt (Néophalte® NT2) is further prepared which contains a polyethylene wax at a ratio of 0.4% of the total weight of the asphalt. Finally, an asphalt according to the invention is produced which further contains a montanic acid ester wax at a ratio of 0.5% of the total weight of the asphalt.

These asphalts are typically used for coating municipal pavements.

The results which are set out in table 3 illustrate the effect of the fatty acid ester wax on the application temperature of the asphalt and the thermoplastic properties of this asphalt.

TABLE 3

| | Bitumen binder 35/50 (%) | Hydrocarbon wax (%) | Montanic acid ester wax (%) | Application temperature (° C.) | Indentation $I_b$ (in 1/10 mm) |
|---|---|---|---|---|---|
| Conventional asphalt AT2 | 7.9 | — | — | 240 | 32 |
| Néophalte ® NT2 | 7.5 | 0.4 | — | 200 | 28 |
| Asphalt according to the invention | 7 | 0.4 | 0.5 | 150 | 35 |

In this case, the asphalt which contains a fatty acid ester wax according to the invention has an indentation value which is equivalent to conventional asphalts and asphalts which contain only one hydrocarbon wax, but with an application temperature which is 90° C. lower and 50° C. lower, respectively.

These formulae having a lower temperature allow the addition of elastomers of the styrene-butadiene-styrene (SBS) type. This addition confers on the binder, and on the final asphalt, improved properties in terms of cracking resistance and very low rigidity moduluses.

These properties, which are provided by the addition of SBS, are retained at a significantly reduced application temperature using the binder of the present invention compared with conventional asphalts and asphalts which contain only one hydrocarbon wax, as indicated by the flexural tests in the cold state, by means of which the minimum temperature is determined at which the asphalt still has ductile rupture.

EXAMPLE 4

In this example, a poured asphalt of the type used for coating floors of industrial premises is prepared ($AI_3$ according to the classification of the specification sheet of the French Asphalt Office) based on a bitumen binder 25/35 modified with a bitumen hardening agent H105/115. This bitumen hardening agent additive has a high level of hardness (penetrability of less than 8/10 mm according to the standard EN 1426) and a ball/ring melting point of between 105° C. and 115° C. This hardening agent is used as an additive in low quantities, typically less than 5% by weight relative to the total of the formula in order to reduce the penetrability of the binder which has been modified in this manner and allow hard asphalts to be formulated for coating floors of industrial premises, which asphalts are compatible with the movement of heavy loads.

An asphalt (Néophalte® $NI_3$) is further prepared which contains a polyethylene wax having a melting point of 125° C. at a ratio of 0.2% of the total weight of the asphalt.

Finally, an asphalt according to the invention is produced which further contains a montanic acid ester wax at a ratio of 0.4% of the total weight of the asphalt.

These asphalts are typically used for coating floors of industrial premises (warehouses, factory halls).

The results in table 4 illustrate the effect of the fatty acid ester wax on the application temperature of the final product and the thermoplastic properties thereof (indentation type C according to NFT 66-002). The indentation value of the asphalt according to the invention is equivalent to that of conventional asphalt or that of asphalt which contains only one hydrocarbon wax, but with an application temperature which is 90° C. lower and 65° C. lower, respectively.

TABLE 4

| | Bitumen binder 25/35 + Hardening agent H105/115 (%) | Hydrocarbon wax (%) | Montanic acid ester wax (%) | Application temperature (° C.) | Indentation $I_c$ (in 1/10 mm) |
|---|---|---|---|---|---|
| Conventional asphalt $AI_3$ | 8.7 | — | — | 255 | 32 |
| Néophalte ® NI3 | 8.5 | 0.2 | — | 230 | 25 |
| Asphalt according to the invention | 8 | 0.2 | 0.4 | 165 | 35 |

EXAMPLE 5

In this example, a poured asphalt of the type used for coatings which can be walked on by pedestrians is prepared ($AT_1$ according to the classification of the specification sheet of the French Asphalt Office), formulated based on a road bitumen binder 50/70.

An asphalt (Néophalte® $NT_1$) is further prepared which contains a polyethylene wax at a ratio of 0.3% of the total weight of the asphalt.

Finally, an asphalt according to the invention is produced which further contains a fatty acid ester Licowax KP Flakes at a ratio of 0.4% of the total weight of the asphalt, which ester is a montanic acid ester wax of purified mineral origin, having a melting point of between 81° C. and 87° C., and having an acid value of between 20 mg KOH/g and 30 mg KOH/g.

These asphalts are typically used for coating pavements used by pedestrians in towns, vehicles being excluded.

The results which are set out in table 5 illustrate the effect of the fatty acid ester wax on the application temperature of the asphalt and the thermoplastic properties thereof.

TABLE 5

|  | Bitumen binder 50/70 (%) | Hydro-carbon wax (%) | Fatty acid ester wax Licowax KPFL (%) | Application temperature (° C.) | Indenta-tion $I_b$ (in $^1/_{10}$ mm) |
|---|---|---|---|---|---|
| Conventional asphalt $AT_1$ | 7.50 | — | — | 235 | 20 |
| Néophalte® NT1 | 7.3 | 0.3 | — | 205 | 26 |
| Asphalt according to the invention | 7.1 | 0.2 | 0.4 | 160 | 20 |

The indentation value of the asphalt according to the invention is equivalent to that of conventional asphalt or that of asphalt containing only one hydrocarbon wax, but with an application temperature which is 75° C. lower and 45° C. lower, respectively.

Owing to the invention described above, it is possible to have a binder which allows asphalt products to be produced at production temperatures which are sufficiently low to substantially eliminate the emissions of fumes. At these temperatures, fume emissions are reduced by a factor of 30 compared with asphalts of the prior art, whilst retaining the mechanical properties of the asphalt products obtained.

These binders further allow the asphalts to be used with a lower energy consumption for producing and transporting these asphalts.

Furthermore, taking into consideration the low production temperatures, the material used for mixing the binder and the fillers is subject to less wear and the use of asphalts containing a binder according to the invention is much more convenient than was the case for asphalts of the prior art.

In this manner, the penetrability of the base product, for example, natural bitumen or bitumen from the oil industry, measured at 25° C. in accordance with the standard ASTM D1321 is advantageously between 25 and 70 tenths of a millimeter, preferably between 35 and 50 tenths of a millimeter.

The invention claimed is:

1. Asphalt product which can be hot-poured and which hardens by means of simple cooling, of the type comprising mineral fillers such as fines, sand and optionally gravel; and a thermofusible binder, this binder being based on natural bitumen or bitumen from the oil industry, of the type comprising, in addition to this base product, a first additive which is constituted by a hydrocarbon wax which is substantially insoluble in the base bitumen of the binder at ambient temperatures and whose melting point, measured in accordance with the standards ASTM D3945 and D3418, is between 110° C. and 140° C., and which reduces the production temperature of the asphalt product relative to that of the base product, characterised in that it further comprises a second additive which is constituted by a fatty acid ester wax selected from montanic acid esters or lignoceric acid esters, this wax having a melting point, measured in accordance with the above standards, of less than 85° C.,
   wherein the binder contains from 4 to 15% by mass of the total formed by the first and second additives relative to the total mass of the binder, and
   wherein the binder contains from 1 to 10% by mass of the second additive relative to the total mass of the binder.

2. Asphalt product according to claim 1, characterised in that the penetrability of the base product is in the order of 35/50.

3. Asphalt product according to claim 1, characterised in that the acid value of the fatty acid ester is between 10 and 70 mg KOH/g, in particular between 20 and 40 mg KOH/g.

4. Asphalt product according to claim 3, characterised in that the acid value is substantially 28 mg KOH/g.

5. Asphalt product according to claim 1, characterised in that the molecular weight of the fatty acid ester is between 500 and 3000 g/mol, in particular between 600 and 1000 g/mol.

6. Asphalt product according to claim 5, characterised in that the molecular weight is substantially 816 g/mol.

7. Asphalt product according to claim 1, characterised in that the hydrocarbon wax is a wax of polymethylene or polyolefine, in particular polyethylene, polypropylene or ethylene/propylene copolymer.

8. Asphalt product according to claim 1, characterised in that the hydrocarbon wax has a penetration, measured at 25° C. in accordance with the standard ASTM D1321, of less than 15/10 mm.

9. Asphalt product according to claim 1, characterised in that it further contains an elastomer, in particular a copolymer of styrene-butadiene-styrene, styrene-butadiene or styrene-isoprene-styrene.

10. Asphalt product according to claim 1, characterised in that the penetrability of the base product, measured in accordance with the standard ASTM D1321, is between 25 and 35 tenths of a millimeter.

11. Asphalt product according to claim 1, characterised in that the penetrability of the base product, measured in accordance with the standard ASTM D1321, is between 50 and 70 tenths of a millimeter.

12. Asphalt product according to claim 1, characterised in that the fatty acid ester is constituted by a carboxylic monoacid ester having a linear chain.

13. Method for preparing an asphalt product which can be hot-poured and which hardens by means of simple cooling, comprising the following steps:
   (a) a thermofusible binder is mixed with fillers, in particular mineral fillers, such as fines, sand and optionally gravel, this binder is based on natural bitumen or bitumen from the oil industry, of the type comprising, in addition to this base product, a first additive which is constituted by a hydrocarbon wax which is substantially insoluble in the base bitumen of the binder at ambient temperatures and whose melting point, measured in accordance with the standards ASTM D3945 and D3418, is between 110° C. and 140° C., and which reduces the production temperature of the asphalt product relative to that of the base product, characterised in that it further comprises a second additive which is constituted by a fatty acid ester wax selected from montanic acid esters or lignoceric acid esters, this wax having a melting point, measured in accordance with the above standards, of less than 85° C., the binder containing from 4 to 15% by mass of the total formed by the first and second additives relative to the total mass of the binder, and from 1 to 10% by mass of the second additive relative to the total mass of the binder, (b) the mixture produced at step (a) is poured, and (c) the poured mixture is allowed to cool, the steps (a) and (b) being carried out at a temperature of between 150 and 170° C.

14. Bituminous concrete, of the type comprising mineral fillers such as fines, sand and optionally gravel; and a thermofusible binder, this binder being based on natural bitumen or bitumen from the oil industry, of the type comprising, in addition to this base product, a first additive which is constituted by a hydrocarbon wax which is substantially insoluble in the base bitumen of the binder at ambient temperatures and whose melting point, measured in accordance with the standards ASTM D3945 and D3418, is between 110° C. and 140° C., and which reduces the production temperature of the asphalt product relative to that of the base product, characterised in that it further comprises a second additive which is constituted by a fatty acid ester wax selected from montanic acid esters or lignoceric esters, this wax having a melting point, measured in accordance with the above standards, of less than 85° C., wherein the binder contains from 4 to 15% by mass of the total formed by the first and second additives relative to the total mass of the binder, and wherein the binder contains from 1 to 10% by mass of the second additive relative to the total mass of the binder, characterised in that it contains recovered asphalt which is recycled during production.

15. Asphalt product according to claim 1, characterised in that it contains recovered asphalt which is recycled during production.

16. Bituminous concrete according to claim 14, characterised in that the penetrability of the base product is in the order of 35/50.

17. Bituminous concrete according to claim 14, characterised in that the acid value of the fatty acid ester is between 10 and 70 mg KOH/g, in particular between 20 and 40 mg KOH/g.

18. Bituminous concrete according to claim 17, characterised in that the acid value is substantially 28 mg KOH/g.

19. Bituminous concrete according to claim 14, characterised in that the molecular weight of the fatty acid ester is between 500 and 3000 g/mol, in particular between 600 and 1000 g/mol.

20. Bituminous concrete according to claim 19, characterised in that the molecular weight is substantially 816 g/mol.

21. Bituminous concrete according to claim 14, characterised in that the hydrocarbon wax is a wax of polymethylene or polyolefine, in particular polyethylene, polypropylene or ethylene/propylene copolymer.

22. Bituminous concrete according to claim 14, characterised in that the hydrocarbon wax has a penetration, measured at 25° C. in accordance with the standard ASTM D1321, of less than 15/10 mm.

23. Bituminous concrete according to claim 14, characterised in that it further contains an elastomer, in particular a copolymer of styrene-butadiene-styrene, styrene-butadiene or styrene-isoprene-styrene.

24. Bituminous concrete according to claim 14, characterised in that the penetrability of the base product, measured in accordance with the standard ASTM D1321, is between 25 and 35 tenths of a millimeter.

25. Bituminous concrete according to claim 14, characterised in that the penetrability of the base product, measured in accordance with the standard ASTM D1321, is between 50 and 70 tenths of a millimeters.

26. Bituminous concrete according to claim 14, characterised in that the fatty acid ester is constituted by a carboxylic monoacid ester having a linear chain.

* * * * *